Nov. 15, 1932.                 M. SPINDEL                 1,887,527
                              TESTING MACHINE
                          Filed Dec. 21, 1926         2 Sheets-Sheet 1

Inventor:
Moses Spindel

Patented Nov. 15, 1932

1,887,527

UNITED STATES PATENT OFFICE

MOSES SPINDEL, OF INNSBRUCK, AUSTRIA

TESTING MACHINE

Application filed December 21, 1926, Serial No. 156,116, and in Austria June 21, 1924.

My present invention relates to testing machines of the general character described and claimed in my prior Patent No. 1,457,800, dated June 5, 1923, and has for its general object to provide certain desirable improvements in such machines designed to enlarge their scope of use.

The machine described in my aforementioned patent may be used advantageously for determining the resistance to wear, the resistance to machining and the frictional resistance of various materials such as that comprising constructional and machine elements, tools and the like, but said machine is not adapted for testing the rolling and the combined rolling and sliding friction of one element against another. Accordingly, the particular object of the invention is to so improve machines of the type described in my aforesaid patent as to adapt them for determining the frictional resistance and the resistance to wear not only of a rotating test piece rolling in peripheral contact with the periphery of a rotating test element, but also of a test piece partaking of a combined rolling and sliding or slipping motion against said test element.

For accomplishing the foregoing object, the machine described in my aforementioned patent is modified by the provision of a test piece holding member which is rotatably mounted on the test piece supporting lever whereby the axis of rotation of the test piece, which is disposed in a plane parallel to the axis of rotation of the test element peripherally engaged by the test piece, may be adjusted in said plane to any desired angular position relative to the axis of rotation of the test element.

In the accompanying drawings wherein is illustrated a machine embodying the improvements:

Figure 1:
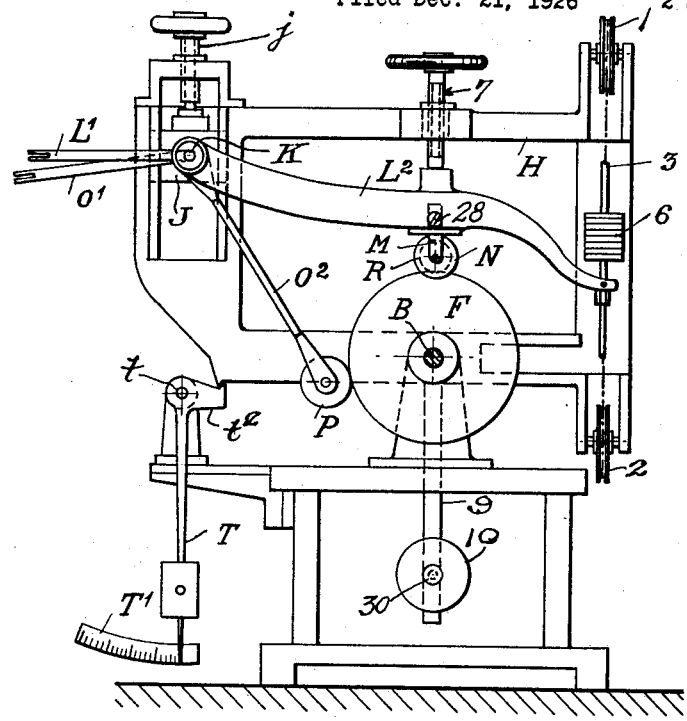
Figure 1 is a front elevation of the machine.
Figure 2:
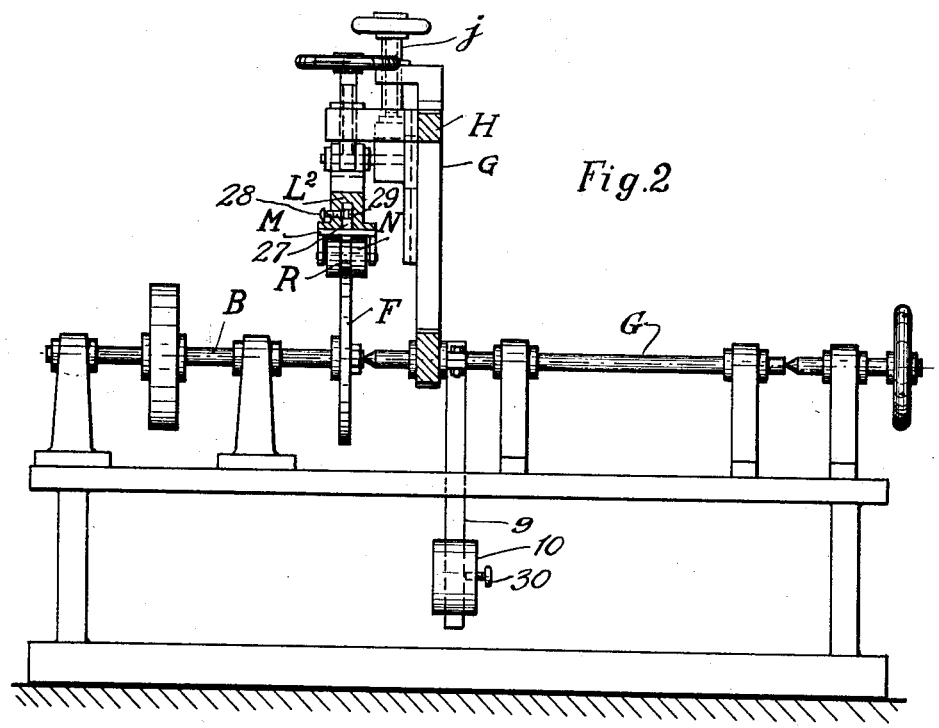
Figure 2 is a side elevation, partly in section.

Referring particularly to Figures 1 and 2 of the drawings, it will be observed that the machine comprises a strong vertically disposed frame H which is mounted on a suitably supported rotatable horizontal shaft G, coaxial with which is a suitably supported rotatable shaft B which is adapted to be driven in any suitable manner. Fixed to the shaft B for rotation therewith is a test element F in the form of a grinding disk, saw or the like.

At one side of the frame H is formed a vertical guideway in which is slidably mounted a block J, vertical adjustments of which are adapted to be effected by an adjusting screw j.

Pivoted at one end as at K, to the block J is a lever L2 which extends over the shaft B and at its opposite end is suitably connected to an endless flexible element 3 which extends over a pair of vertically spaced sheaves 1 and 2 carried by the frame H, said element 3 carrying adjustable weight means 6.

Carried by the lever L2 at the underside thereof is a bracket M in which the test piece N in the form of a cylindrical or disk-like specimen of the material to be tested is rotatably mounted on an axis parallel to the shaft B for peripheral contact with the periphery of the test element F. The bracket M is provided with a stud 27 disposed within an opening in the lever L2 and having an annular groove 29 receiving the inner end of a clamping screw 28 threaded in said lever whereby the bracket is adapted to be rotated relative to the lever and to be secured in any desired rotated position relative thereto.

The adjustable weight means 6 operating through the lever L2 affords means for pressing the test piece N under a measurable pressure against the test element F, different weights being employed according to the particular nature of the test piece undergoing examination.

A pendulum 9, fixed to and depending from the shaft G, is provided with a weight 10 slidably adjustable therealong whereby the frame H may be balanced on the shaft G. A screw 30 threaded into the weight 10 for engagement with the pendulum 9 constitutes means for securing the weight in different adjusted positions along the pendulum.

The shaft B and the test element F are adapted for counter-clockwise rotation as viewed in Figure 1, and when the test piece N is pressed against the test element F such rotation of said test element tends also to rotate the frame H in a counter-clockwise direction. To resist such rotation of said frame a two-arm lever T is pivoted to a suitable fixed support, as at $t$, and has one arm $t2$ thereof extending laterally beneath the frame H in suitable supporting relation thereto, and its other arm depending and weighted and provided with a pointer for cooperation with a scale T1. Thus, rotation of the frame H under the influence of the test element F swings the lever T which, with the scale T1, constitutes a pendulum dynamometer by means of which the tangential force acting between the test element and the test piece is indicated, this force being at the same time a measure of the work being performed for a known peripheral velocity of the test element. The rotation of the lever L2 about its pivot K is a measure of the amount of material removed from the test piece N and the wear on the test element F, and is indicated by means of an arm L1 fixed to the lever L2 and cooperating with suitable recording means as disclosed, for example, in Figures 3 and 5 of my aforesaid Patent No. 1,457,800.

Pivotally mounted on the same pivot K as the lever L2 is a lever O2 which extends to a point adjacent to the test element F and at its free end carries a roller P which contacts with the periphery of said test element. The rotation of this lever O2 about its pivot K is a measure of the wear on the test element F and is indicated by an arm O1 fixed to said lever and cooperating with suitable recording means as also disclosed, for example, in Figures 3 and 5 of my aforesaid patent.

Knowing the pressure of the test piece N against the test element F, the rate of rotation of the test element and the nature thereof, it obviously is possible by means of the indications afforded by the dynamometer T and the recording means cooperating with the arms L1, O1 of the levers L2, O2, respectively, to determine accurately the resistance both as to rolling friction and wear of a test piece N of any given material rolling against any other given material.

A screw 7 is threaded in the frame H and is suitably engaged with the lever L2 for moving the latter to force either a test piece N carried by the lever firmly against the test element F, or to force the lever directly and firmly against said test element, whereby any oscillation of the lever L2 relative to the frame H is prevented.

Figure 3:
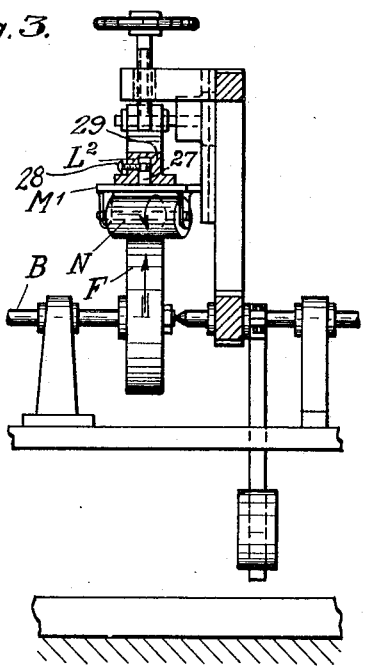
Figure 3 is a side elevation, partly in section, illustrating the position of the test piece for generating a combined rolling and sliding friction between the test piece and the cooperating test element.
Figure 4:
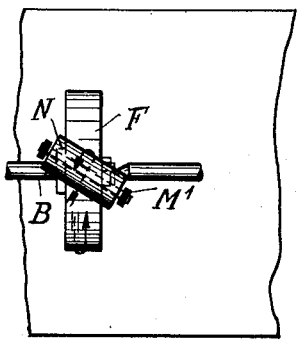
Figure 4 is a plan view of the parts shown in Figure 3.

In order to generate a combined rolling and sliding friction between the test piece and the test element, the test piece is rotatably adjusted and fastened for example by the clamp screw 29 in the position illustrated in Figures 3 and 4 whereby the axis of rotation of the test piece instead of extending parallel to the shaft B, as in Figures 1 and 2, extends diagonally at a suitable angle to the shaft B. Obviously, under these conditions and due to the different directional rotary motions of the test piece and the test element, a combined sliding and rolling action will occur between said test piece and said test element as the former is driven by the latter.

In view of the foregoing description considered in connection with the accompanying drawings it is believed that the improvements on the invention disclosed in my prior patent will be fully understood. It is desired to point out, however, that while specific embodiments of the invention have been illustrated in the drawings and described herein, various modifications of the structure shown may be resorted to within the spirit and scope of the invention as defined in the appended claims.

I claim:

1. A testing machine of the character described comprising a rotatable shaft, a test element mounted on said shaft for rotation therewith, a frame pivoted for rocking movement on an axis coincident with the axis of said shaft, a lever having a pivotal connection at one end with said frame and extending across said shaft, means weighting the other end of said lever to urge the same towards said shaft, means for mounting a rotatable test piece on said lever with its own axis of rotation in a plane parallel to the axis of rotation of the test element and also for rotatable adjustment about an axis at right angles to its own axis of rotation whereby its plane of rotation may be disposed at any desired angle relative to the plane of rotation of the test element, a pendulum dynamometer resisting rotation of the frame under the influence of the tendency of the test piece to rotate with the test element about the axis of the latter, means for indicating the rotation of the lever about its pivot resulting from wear on the test piece and on the test element, and separate means for indicating the wear on the test element produced by engagement of the test piece therewith.

2. A testing machine of the character described comprising a rotatable shaft, a test element mounted on said shaft for rotation therewith, a frame pivoted for rocking movement on an axis coincident with the axis of said shaft, a lever having a pivotal connection at one end with said frame and extending across said shaft, means weighting the other end of said lever to urge the same towards said shaft, a bracket mounted on said lever for rotatable adjustment about an axis at substantially right angles to the axis of rotation of the test element, means for mounting a rotatable test piece on said bracket with its own axis of rotation in a plane parallel to the axis of rotation of the test element, a pendulum dynamometer resisting rotation of the frame under the influence of the tendency of the test piece to rotate with the test element about the axis of the latter, means for indicating the rotation of the lever about its pivot resulting from wear on the test piece and on the test element, and separate means for indicating the wear on the test element produced by engagement of the test piece therewith.

In testimony whereof I affix my signature.

MOSES SPINDEL.